United States Patent [19]

Pittman

[11] 4,156,161

[45] May 22, 1979

[54] TUBE SOCKET WITH DUAL SPARK GAP PROTECTION

[75] Inventor: Robert P. Pittman, River Edge, N.J.

[73] Assignee: Industrial Electronic Hardware Corp., New York, N.Y.

[21] Appl. No.: 823,616

[22] Filed: Aug. 11, 1977

[51] Int. Cl.[2] .......................... H01T 3/00; H02H 9/06

[52] U.S. Cl. ...................................... 313/325; 313/51; 339/14 T

[58] Field of Search .......................... 313/325, 51, 318; 339/14 T

[56] References Cited

U.S. PATENT DOCUMENTS

| | | | |
|---|---|---|---|
| 3,240,980 | 3/1966 | Schuster | 313/51 X |
| 3,251,016 | 5/1966 | Manetti et al. | 313/51 X |
| 3,767,951 | 10/1973 | Dumas et al. | 313/325 X |
| 3,865,452 | 2/1975 | Pittman | 313/325 X |

*Primary Examiner*—Alfred E. Smith
*Assistant Examiner*—Charles F. Roberts
*Attorney, Agent, or Firm*—James & Franklin

[57] ABSTRACT

A tube socket is especially adapted for use with a longitudinally extending cathode ray tube of the type having a plurality of high voltage pins and a plurality of relatively low voltage pins spaced apart, with each of the high voltage pins being encased in a protective silo. The socket includes a cap member defining a silo filler open at the bottom thereof and adapted to enter the tube silo. High voltage terminals mounted on the cap member extend into the silo fillers and are adapted to conductively receive the high voltage pins.

50 Claims, 9 Drawing Figures

TUBE SOCKET WITH DUAL SPARK GAP PROTECTION

This is a division of application Ser. No. 713,599, filed Aug. 12, 1976.

BACKGROUND OF THE INVENTION

The present invention relates to a cathode ray tube socket, and more particularly to a cathode ray tube socket providing dual spark gap protection.

U.S. Pat. No. 3,865,452 describes a cathode ray tube socket having dual spark gap protection, i.e., having two separate and independent grounding capabilities such that the high voltage terminal has a high voltage grounding member, the low voltage terminals have a common low voltage grounding member, and a spark which has jumped from the high voltage terminal (normally operated at 25,000 volts D.C. or greater) to the high voltage grounding member cannot jump back to any of the low voltage terminals (normally operated in the range of a few thousand volts) and thus damage the tube. The socket therein described is especially adapted for use with cathode ray tubes having a plurality of low voltage pins and a single high voltage pin.

A recent development in the cathode ray tube field is a tube having not only a plurality of low voltage pins, but also a plurality of high voltage pins (i.e., pins normally operated at 10,000 volts or higher), generally two of the high voltage pins. A tube socket of the design specifically disclosed in U.S. Pat. No. 3,865,452 does not easily lend itself to adaptation for use with the new tubes for a number of reasons. As the length of the air gap required to provide spark gap protection is a positive function of the operating voltage of the terminal to be protected, two relatively large air gaps must be maintained in a single tube socket while maintaining the tube socket as small and compact as possible. Furthermore, means must be provided for isolating and expelling from the interior of the tube socket any ozone produced by sparking of one of the high voltage terminals before that ozone has an opportunity to ionize the air in the air gap associated with the other high voltage terminal and thus lead to premature firing of that other high voltage terminal. Finally, means must be provided to isolate and contain high voltage sparking as the use of a plurality of high voltage terminals introduce the possibility of sparking of one high voltage terminal affecting the other high voltage terminals, as well as increasing the possible danger to equipment in the area from the sparking of any one of the high voltage terminals.

As the new tubes types are more sensitive than the old tubes, the new tubes, whether they employ one or a plurality of high voltage pins, are more likely to produce noise or static in the presence of a corona effect. Such a corona effect results from the use of a high voltage terminal having points or sharp edges and causes ionization of the air about the sharp edge or point, thus making the air more conductive and leading to a lower voltage breakdown point for all pins in the area of the ionized air. Where the new tubes employ a plurality of high voltage pins, the corona effect produced by one high voltage terminal is capable of affecting the other high voltage terminals in the area, and thus the avoidance of a corona effect is of even greater importance when the tube employs a plurality of high voltage pins.

It will be recognized by those skilled in the art that the isolation and expelling of ozone, the isolation and containment of high voltage sparking, and the minimization of corona effect are all desireable features of a tube socket, albeit in differing degrees, regardless of whether the socket affords dual spark gap protection, single spark gap protection, or even no spark gap protection.

Accordingly, it is an object of the present invention to provide a tube socket for use with a cathode ray tube of the type having a plurality of high voltage pins as well as a plurality of low voltage pins.

Another object is to provide a tube socket which provides for isolation and venting of ozone produced by sparking of a high voltage pin.

Still another object is to provide such a tube socket for use with a tube having a plurality of high voltage pins, the tube socket providing for isolation and venting of ozone produced by sparking of one high voltage terminal before it can effect premature sparking of another high voltage terminal.

A further object is to provide a tube socket which minimizes the production of corona effect from a high voltage terminal.

Still a further object is to provide such a tube socket for use with a tube having a plurality of high voltage pins, the tube socket minimizing the production of corona effect from any of the high voltage terminals.

It is also an object to provide a tube socket which effectively isolates and contains sparking of a high voltage terminal to protect equipment in the vicinity thereof.

It is also a further object to provide such a tube socket for use with a tube having a plurality of high voltage pins, the tube socket effectively isolating and containing sparking of any of the high voltage terminals to protect the other high voltage terminals as well as any other equipment in the vicinity.

It is another object to provide a tube socket which is easily and inexpensively manufactured yet sturdy and compact in design.

Yet another object is to provide any and/or all of the above features in a tube socket affording dual spark gap protection.

It is still another object of the present invention to provide a cap member which is a removable part of the tube socket and contains all of the high voltage terminals.

SUMMARY OF THE INVENTION

It has now been found that the above and related objects of the present invention are obtained in a tube socket for use with a longitudinally extending cathode ray tube of the type having a high voltage pin and a plurality of relatively low voltage pins spaced apart, with the high voltage pin being cased in a protective silo open at the top thereof. The socket comprises a support having top and bottom surfaces. A plurality of first terminals are mounted on the support, each of the first terminals being adapted to conductively receive a different one of the low voltage pins. A cap member secured to the support defines a silo filler open at the bottom thereof and adapted to enter the tube silo. A second terminal is mounted on the cap member, extends into the silo filler, and is adapted to conductively receive the high voltage pin. First and second grounding members are mounted on the support and spaced from and associated with the first and second terminals respectively. Means are provided for separately electrically connecting to ground the first and second grounding members, so that a spark can independently bridge a gap between the respective grounding members and the terminals associated therewith without affecting the other terminals.

In a preferred aspect of the present invention, the first grounding member is radially offset from the first terminals such that a spark from one of the first terminals travels in a direction substantially perpendicular to the longitudinal axis of the tube. The second grounding member is vertically offset from a portion of the second terminal such that a spark from the second terminal travels in a direction substantially parallel to the longitudinal axis of the tube, and hence perpendicular to the travel path of the spark from the first terminal. Preferably the cap member is removable from the support and has a silo filler extending substantially parallel to the longitudinal axis of the tube.

Generally the support comprises a top plate, bottom plate and intermediate plate therebetween. Portions of the first terminals and portions of the first grounding member are disposed intermediate the bottom plate and the top plate, the first grounding portions being radially spaced from the first terminal portions. Preferably the first grounding portions and first terminal portions are secured to the upper face of the intermediate plate with the first grounding portions being spaced outwardly from the first terminal portions. The cap member is preferably independently and directly secured on both the top and bottom plates of the support.

The cap member and support together define a spark chamber, the second terminal and the second grounding member extending into the spark chamber from opposite ends thereof. The cap member may further define a vent chamber in gaseous communication with the spark chamber.

In a preferred embodiment of the tube socket, designed for use with a tube having a plurality of high voltage pins, each encased in its own protective silo, the cap member defines a plurality of the silo fillers. The socket has a plurality of the second terminals extending into respective ones of the silo fillers and being adapted to receive respective ones of the high voltage pins, and a plurality of second grounding members associated with respective ones of the second terminals. The cap member and the support together define a plurality of individual spark chambers isolated from each other, each of the second terminals and each of the second grounding members extending into respective ones of the spark chambers from opposite ends thereof. The cap member further defines a plurality of vent chambers, each of the vent chambers being in gaseous communication with a respective one of the spark chambers and isolated from the other of the vent chambers and spark chambers. The cap member is removable from the support and contains disposed therein all of the high voltage terminals. Preferably the cap member is independently and directly secured both to the top plate and the bottom plate of the support.

Another aspect of the present invention comprises a cap member for use with a tube socket having a protective silo open at one end thereof and a grounding member. The cap member comprises an insulative housing and a terminal. The insulative housing includes means for securing the housing to the tube socket, the housing defining a silo filler adapted to enter the protective silo through the open end thereof, a spark chamber, and optionally a vent chamber in gaseous communication with the spark chamber. The terminal has one end thereof disposed in the silo filler to conductively receive a pin, the other end thereof extending from the housing for connection to an external circuit, and an intermediate portion thereof extending into the spark chamber and adapted to be positioned in generally vertical alignment with, and spaced from, the grounding member.

In a preferred embodiment of the cap member adapted for use with a tube socket having a plurality of protective silos, the housing defines a plurality of the silo fillers, each adapted to enter a respective one of the protective silos, a like plurality of spark chambers electrically isolated from one another, and optionally a like plurality of vent chambers, each of the vent chambers being in gaseous communication through the housing with only a respective one of the spark chambers.

DETAILED DESCRIPTION OF THE PREFERRED EMBODIMENTS

Figure 1:
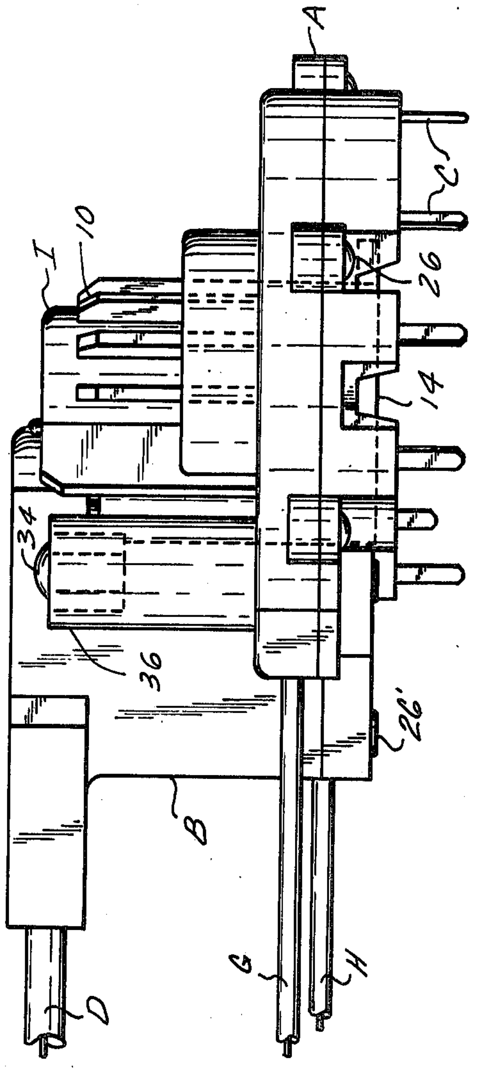
FIG. 1 is a side elevation view of a tube socket according to the present invention, and a portion of the tube used therewith.
Figure 2:
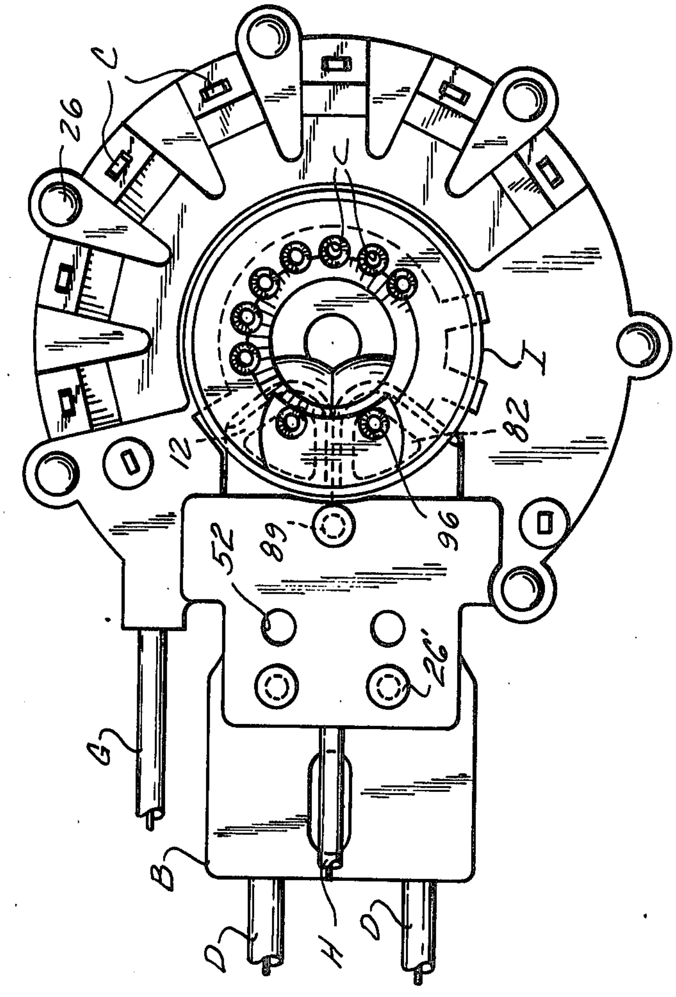
FIG. 2 is a bottom plan view thereof.
Figure 3:
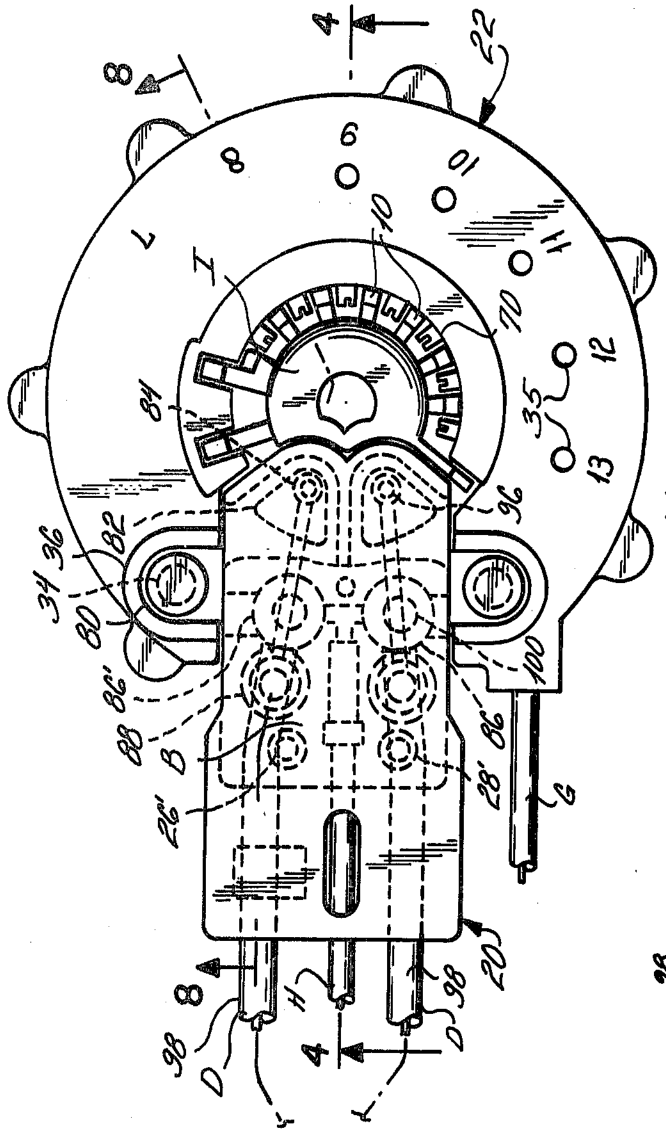
FIG. 3 is a top plan view thereof.

Referring now to the drawing, and in particular to FIGS. 1 and 2 thereof, therein illustrated in a tube socket according to the present invention. Generally speaking, the tube socket comprises a support A and a cap member B secured to the support A. A plurality of first or low voltage terminals C are mounted on the support A, and a plurality of second or high voltage terminals D are mounted on the cap member B. First and second grounding members E and F (see FIG. 5) are mounted on the support A and spaced from and associated with the first and second terminals C and D, respectively. Means G and H are provided for electrically connecting to ground the first and second grounding members E and F, respectively.

A further description of the socket can best be appreciated after a consideration of the tube for which it is designed. Referring now to FIGS. 1-6 and 8, therein illustrated is the tube end I which is received within the tube socket. The tube end I has the general configuration of a longitudinally-extending hollow cylinder. Disposed about the cylinder circumference are a plurality of circumferentially spaced, longitudinally extending radial projections 10, and a pair of adjacent circumferentially spaced longitudinally extending protective silos 12. The base 14 of tube end I defines a plurality of apertures 16, 16′ through which the tube pins 15, 15′ (indicated in phantom line in FIG. 4) extend towards the socket, each low voltage pin 15 extending upwardly through an aperture 16 and being disposed intermediate a pair of projections 10 and each high voltage pin 15' extending through an aperture 16' and thereafter being disposed within a protective silo 12. The portion of the base 14 adjacent to projections 10 extends radially outwardly beyond the projections 10 so as to act as a stop limit for insertion of the tube end I into the support A of the tube socket. Except for the small apertures 16' at the base 14 thereof filled by the high voltage pins 15', the protective silos 12 are open only at the top thereof.

Turning now to the socket itself, the insulating support A thereof is comprised of a generally circular bottom plate generally designated 20, a generally U-shaped top plate generally designated 22, and a generally semicircular intermediate plate generally designated 24, each defining part of a large central aperture 25 extending through the support A and configured and dimensioned to receive the upper portion of tube end I (with portions of base 14 abutting bottom plate 20). The top plate 22 is provided with downwardly extending lugs 26 and the bottom plate 20 is provided with apertures 28 adapted to snugly receive the lugs 26 when the top and bottom plates 22,20 are assembled together with the intermediate plate 24 therebetween.

The top plate 22 has an inner surface 30 defining a plurality of circumferentially spaced, longitudinally extending recesses 32 communicating with the large central aperture 25. The top plate 22 includes at each end thereof a post 34 and protective housing 36 spaced from the post 34 and partially enclosing it along the sides thereof. A plurality of apertures or vents 35 are provided to enable the escape from the socket interior of any ozone produced by low voltage sparking.

The bottom plate 20 is provided with a plurality of circumferentially spaced slots 40 therethrough about the circumference thereof and a plurality of indentations 42 on the top surface thereof radially aligned with the slots 40. Adjacent to and outwardly of the portion of the bottom plate 20 through which the high voltage silos 12 pass, a pair of protective housings 46,46' extend upwardly. The facing portions of the protective housings 46,46' define slots 48 which communicate with a generally T-shaped depression 50 extending between the slots 48 and therefrom to the circumference of the upper surface of the lower plate 20. On each side of the indentation 50 is an aperture 28' and a vent 52, each vent 52 being disposed outwardly from its associated aperture 28'. Spaced inwardly from depression 50 is another aperture 51, the apertures 28',51 and vents 52 being adapted to cooperate with the cap member B in a manner to be described hereinafter.

The intermediate plate 24 is configured and dimensioned to fit within a recess 60 on the bottom surface of the top plate 22. An arcuate grounding plate 62 is secured to the top surface of the intermediate plate 24 adjacent the circumference thereof by means of lugs 64 projecting upwardly from the top surface of the intermediate plate 24 and extending through suitably provided apertures in the grounding plate 62. Adjacent the inner circumference of the intermediate member 24 are a series of radially disposed intermediate conductive members 66, each connected to the intermediate plate 24 by means of a fastening bump 68. Each intermediate conductive member 66 extends from a point slightly spaced radially inwardly from the grounding plate 62, radially inwardly on the upper surface of the intermediate plate 24, then downwardly along the inner surface of the intermediate plate 24, and finally projects downwardly slightly beyond the bottom of intermediate plate 24. Initially the intermediate conductive members 66 may be connected to the grounding plate 62 to form a single, easily manipulatable unit for assembly purposes, then, once the composite has been fixed to the intermediate plate 24, portions thereof are cut away to provide spark gaps 67 of appropriate length between the grounding plate 62 and each individual intermediate conductive member 66.

Figure 5:
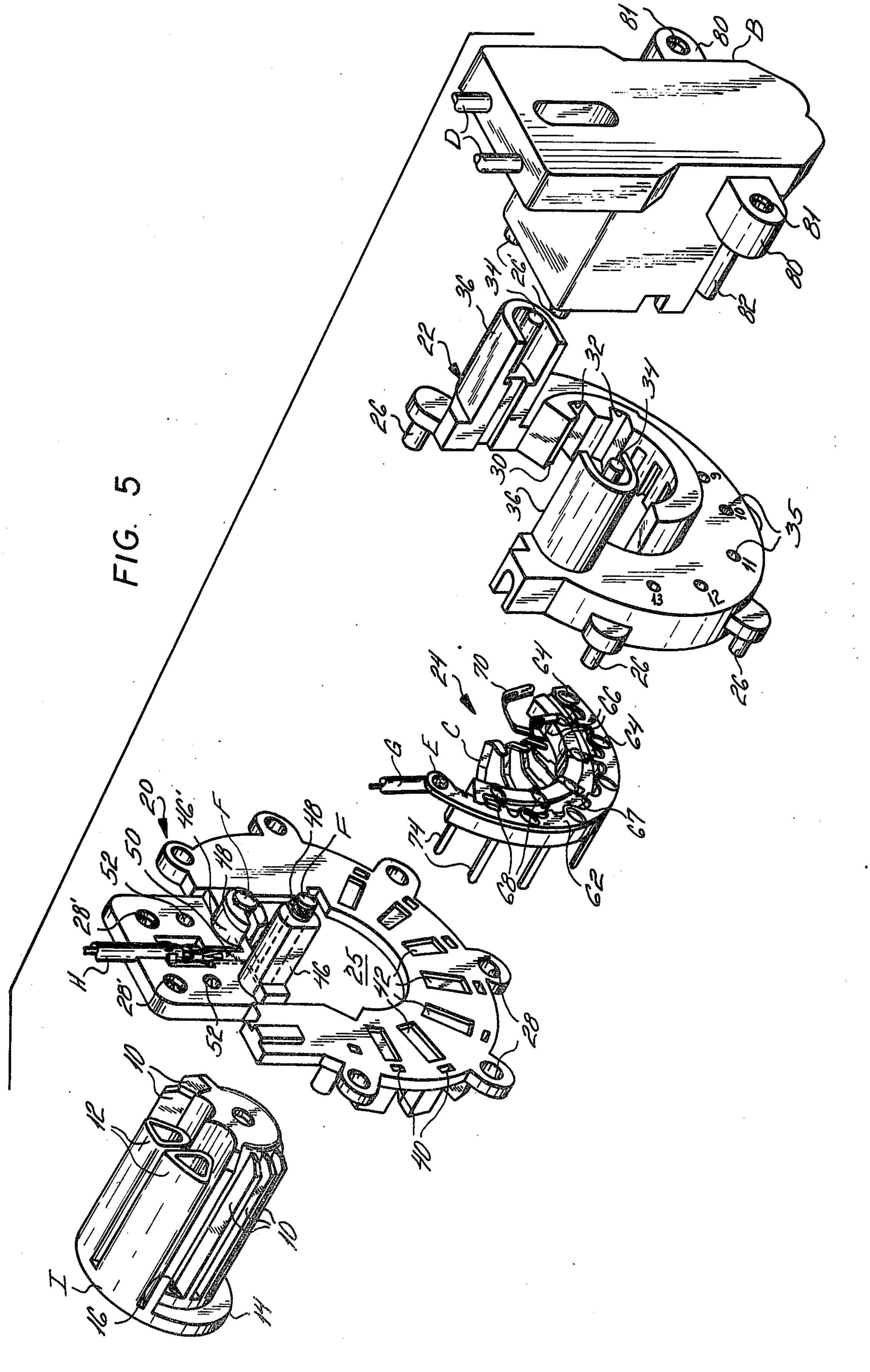
FIG. 5 is an exploded isometric view thereof.
Figure 6:
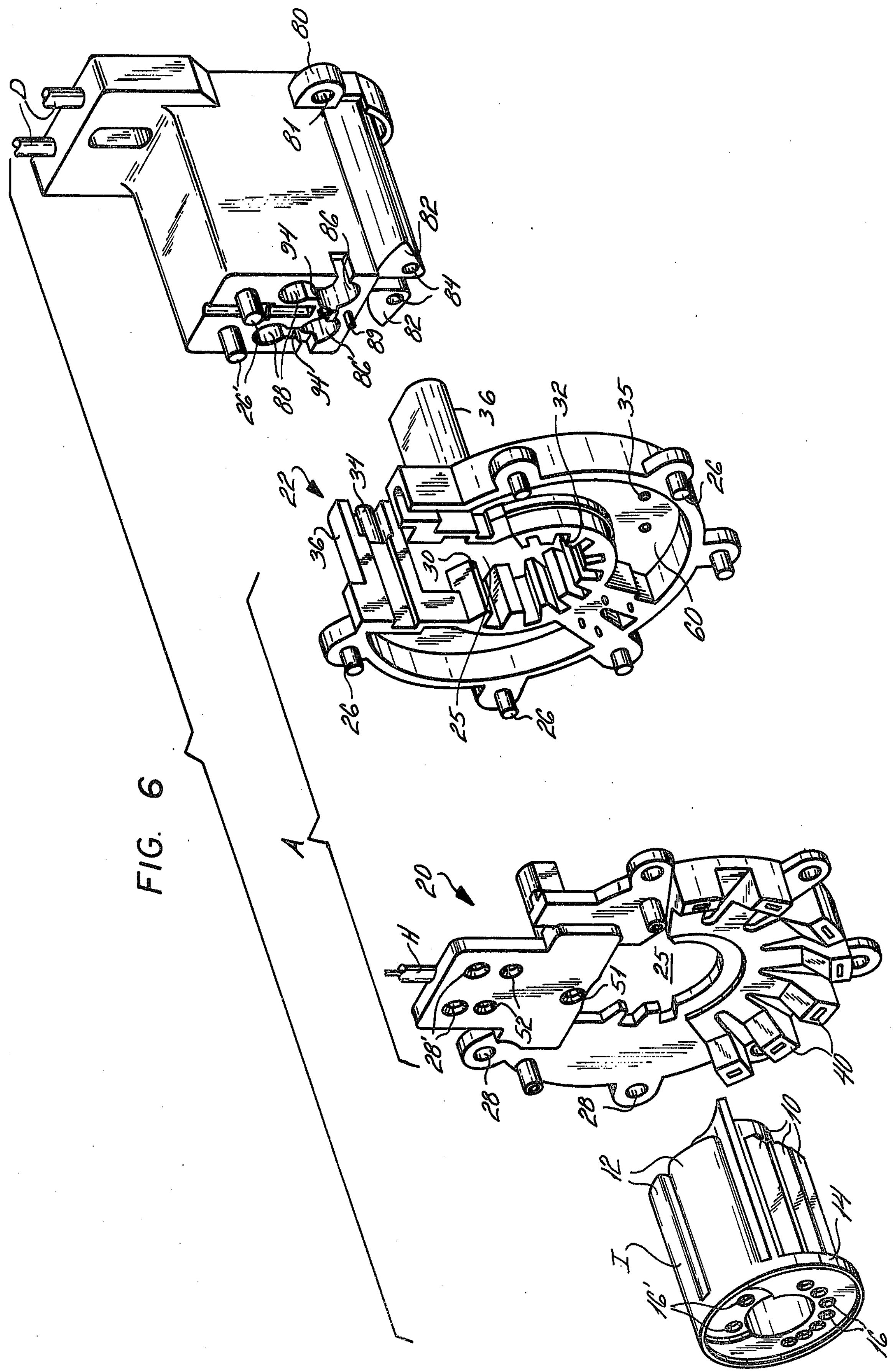
FIG. 6 is an exploded isometric view thereof, taken along a different angle than that of FIG. 5, with the intermediate plate thereof being removed for clarity of illustration.
Figure 7:
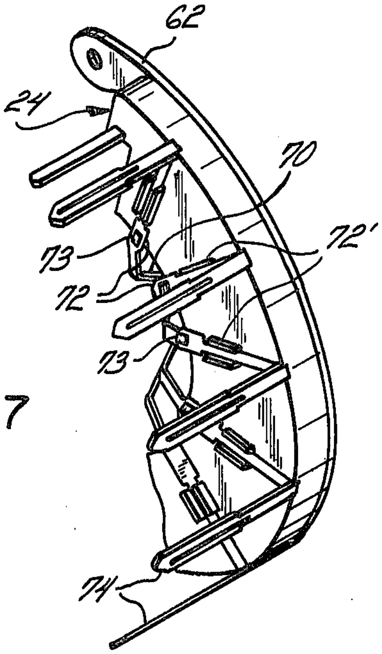
FIG. 7 is an isometric view of the intermediate plate to a slightly enlarged scale.
Figure 9:
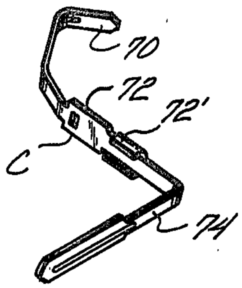
FIG. 9 is an isometric view of a terminal.

Now that the support A and the tube end I have been described in detail, the interaction of these parts with the low voltage terminals C can be appreciated. Referring now in particular to FIGS. 5, 7 and 9, each low voltage terminal C has a resilient curved upper portion 70 which is seated within an associated recess 32 on the inner surface of the upper plate 22, with the curved portion thereof extending inwardly (into central aperture 25) so as to contact a low voltage pin 15 carried by the tube end I intermediate a pair of ridges 10. Each low voltage terminal C has an intermediate portion 72 extending downwardly from the upper portion 70, past the inner surface of intermediate plate 24, and then radially outwardly along the top surface of the lower plate 20. Each intermediate terminal portion 72 is adapted to conductively receive a projecting end 73 of an associated intermediate conductive member 66 and includes a flanged segment 72' which is press fit into a corresponding indentation 42 on the top surface of the lower plate 20. Each low voltage terminal C has a bottom portion 74 adapted to extend through an associated slot 40 in the lower plate 20 and project downwardly therefrom for connection to an external circuit (not shown). Thus each low voltage pin 15 carried by the tube end I may be connected to the external circuit by means of a low voltage terminal C, with each low voltage terminal C providing a spark protection by means of a gap 67 between its associated intermediate conductive member 66 and the low voltage grounding plate 62. It will further be appreciated that the tube is generally longitudinally aligned with its low voltage pins so that a spark from one of the low voltage terminals C will travel towards grounding plate 62 in a direction substantially perpendicular to the longitudinal axis of the tube. The spark generated is, of course, grounded by the grounding plate 62 and its wire connection G to ground. Ozone produced by such low voltage sparking will escape from the tube socket via the vents 35 provided in the upper plate 22 over each low voltage spark gap 67.

Referring now in particular to FIGS. 1, 3–6 and 8, the cap member B is generally rectangular in configuration and provided with a pair of outwardly extending apertured ears 80. The aperture 81 in each ear 80 receives one of the posts 34 of the upper plate 22 with the circumferential surface of the ear 80 fitting snugly within the housing 36 associated with the post 34, thus removably securing the cap member B to the upper plate 22 of the support A. Disposed adjacent the front of the cap member B are in adjacent pair of downwardly extending silo fillers 82 configured and dimensioned to fit within the pair of protective silos 12 of the tube end I. Each silo filler 82 has a channel 84 extending axially therethrough and adapted to receive a high voltage tube pin 15'. The cap member B also includes a pair of high voltage spark cap chambers 86, a pair of vent chambers 88, a positioning stub 89 and a pair of downwardly projecting fastening stubs 26'. When the cap member B is in place atop the support A, its fastening stubs 26' and positioning stub 89 enter apertures 28' and 51, respectively, of the lower plate 20 of support A for the purpose of further structurally connecting the cap member B and the support A. In this position, vent chambers 88 of cap member B are aligned with and in communication with vents 52 of the lower plate 20 for venting purposes, and spark gap chambers 86,86' of cap member B are aligned with and receive the upwardly projecting lower plate housings 46,46', respectively (which close the bottoms of spark gap chambers 86,86'). To further enhance the structural strength of the tube socket, stubs 26', once properly positioned within apertures 28', may be fixedly secured to lower plate 20 by conventional means, for example, by cementing or heat sealing. Each spark gap chamber 86,86' is adjacent to and in gaseous communication with its own associated vent chamber 88 through a vertically-extending slot 94 in the wall separating each spark gap chamber 86,86' and its associated vent chamber 88, each slot 94 extending upwardly higher in the associated spark chamber than the associated housing 46,46'.

A high voltage grounding member F is disposed within each of the housings 46,46', with one end thereof extending upwardly into the spark gap chamber 86,86' and the other end electrically connected to one side of the T-shaped end of the means H for grounding the member F. The means H is disposed in the depression 50 of the lower plate 20 and connects both of the grounding members F to ground. (The purpose of the slots 48 in the housings 46,46' is simply to enable placement of the means H in the depression 50 with opposing sides thereof located in the housings 46,46'). Now that the cap member B has been described in detail, the interaction thereof with the high voltage terminals D can be appreciated.

Figure 4:
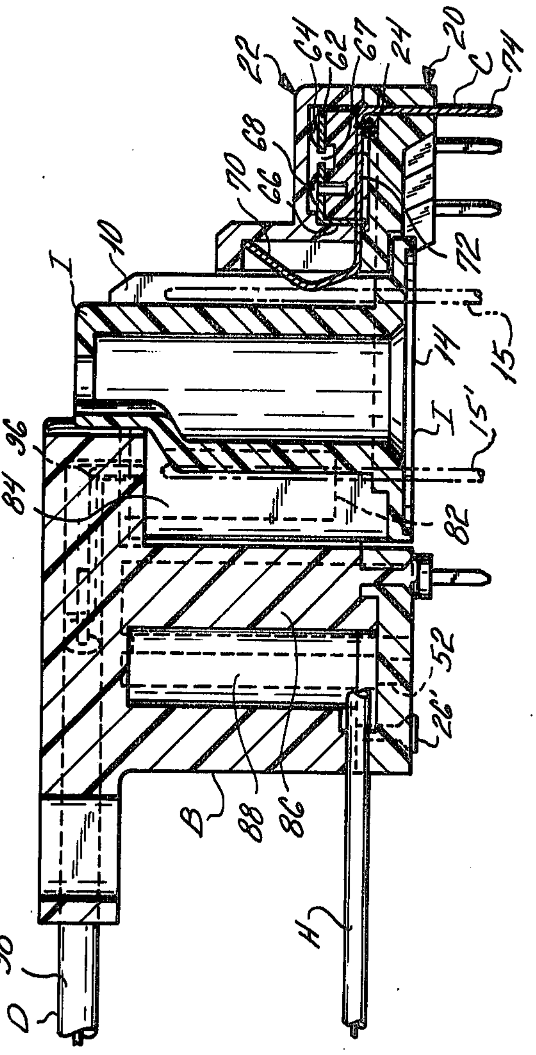
FIG. 4 is a side elevation view thereof, partially in cross-section, taken along the line 4—4 of FIG. 3.
Figure 8:
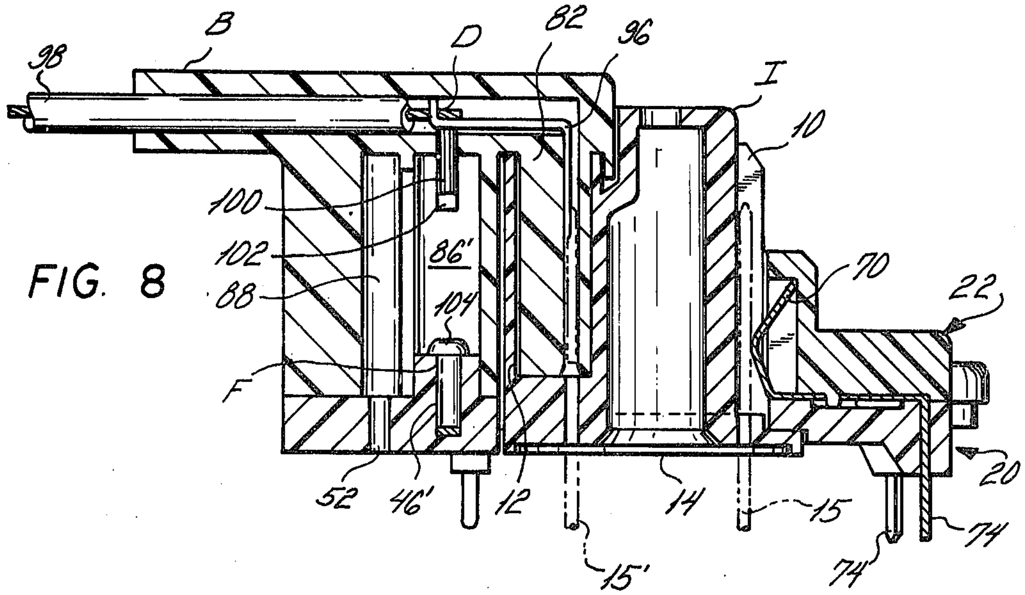
FIG. 8 is a side elevation view of the tube socket, partially in cross section, taken along the line 8—8 of FIG. 3.

Referring now to FIGS. 2, 4 and 8, and particularly FIG. 8, it will be appreciated that each of the high voltage terminals D includes a resilient end portion 96 at least partially disposed within the silo filler 82 and adapted to be contacted by a high voltage tube pin 15', a more flexible or wire end 98 which extends rearwardly from cap member B for connection to an external circuit (not shown), and a rigid intermediate portion 100 electrically connected to both ends and configured and dimensioned to extend downwardly through the top of an associated spark gap chamber 86,86'. The bottom of the intermediate portion 100 of each high voltage terminal D is spaced vertically from the top of its associated high voltage grounding member F, thereby to provide spark gap protection for the high voltage terminals D. The spacing between a particular high voltage terminal intermediate portion 100 and its associated grounding member F will be determined by the degree of spark gap protection as desired. In the embodiment illustrated, both intermediate portions 100 extend downwardly the same distance, while the two high voltage grounding means F extend upwardly to different heights reflecting inversely the anticipated different operating voltages of the two high voltage terminals D. Obviously, if desired, both grounding means F could extend upwardly to the same height, with the high voltage intermediate portions 100 extending downwardly to differing levels, and in fact for particular applications where both high voltage terminals were to be operated at the same voltages, the lengths of the grounding members F and high voltage intermediate portions 100 could be arranged so that the spacing therebetween was identical.

In order to reduce corona effect from the high voltage terminals D, each high voltage intermediate portion 100 has at its lower end a smoothly contoured head 102 and the high voltage grounding member F has at its upper end a similar smoothly contoured enlarged head 104, the facing heads being devoid of points and sharp edges.

When the voltage on either of the high voltage terminals D exceeds the sparking value, a spark is generated between the high voltage terminal head 102 and the high voltage grounding means head 104, the spark being conducted to ground from the high voltage grounding means F via the means H connecting it to ground. Ozone produced during the sparking escapes from a spark gap chamber 86,86' through slot 94 to the associated vent chamber 88, and hence out the tube socket via the vent 52 associated with the particular vent chamber 88. It will be recognized that each spark gap chamber 86 or 86' and its associated vent chamber 88, and its associated vent 52 are independent structures which coact as a unit, without affecting the other unit, so that sparking of one high voltage terminal cannot through ozone production cause sparking of the other high voltage terminal.

As the high voltage grounding members F are vertically offset from the high voltage intermediate portions 100, a spark from a high voltage intermediate portion 100 travels towards the high voltage grounding member F in a direction substantially parallel to the longitudinal axis of the tube, and therefore transverse to the direction of a spark from one of the low voltage terminals C.

The design of the socket enables high voltage sparking to be isolated and contained within a given spark chamber 86,86' and the ozone produced thereby to be isolated and contained in a given vent chamber 88 (isolated from the other vent chamber 88 and spark chamber 86,86') until vented through vent 52. All high voltage sparking is effectively contained within the cap member B, which carries all the high voltage terminals and is easily replaceable in the event of damage thereto caused by such sparking.

It will be appreciated that the tube socket of the present invention, while particularly suitable for use with a cathode ray tube of the new type having a plurality of high voltage pins as well as a plurality of low voltage pins, is easily adapted for use with a conventional cathode ray tube having only a single high voltage pin and a plurality of low voltage pins. The tube socket minimizes the creation of corona effect from a high voltage terminal, effectively isolates any high voltage sparking to protect equipment and in the vicinity, and provides for adequate isolation venting of the ozone produced by the high voltage sparking. The tube socket is, furthermore, sturdy and compact while being easily and inexpensively manufactured.

Now that the preferred embodiments of the present invention have been shown and described in detail, various modifications and improvements thereon will become readily apparent to those skilled in the art. For example, the principles involved in the use of a spark chamber and associated vent chamber are equally applicable to sockets providing only a single spark gap protection feature (as opposed to a dual spark gap feature), and the principles involved in the use of a tube socket having a reovable cap member to receive a high voltage tube pin are equally applicable to sockets devoid of any spark gap protection feature. Accordingly, the spirit and scope of the present invention is to be limited by only the appended claims, and not by the foregoing specification.

I claim:

1. A tube socket for use with a cathode ray tube of the type having a high voltage pin and a plurality of relatively low voltage pins spaced apart, with the high voltage pin being encased in a protective silo open at the top thereof, said socket comprising:

A. a support having top and bottom surfaces;

B. a plurality of first terminals mounted on said support, each of said first terminals being adapted to conductively receive a different one of the low voltage pins;

C. a cap member secured to said support and defining a silo filler open at the bottom thereof and adapted to enter the tube silo;

D. a second terminal mounted on said cap member, extending into said silo filler, and adapted to conductively receive the high voltage pin;

E. first and second grounding members mounted on said support and spaced from and associated with said first and second terminals, respectively; and F. means for separately electrically connecting said first and second grounding members to ground, whereby a spark can independently bridge a gap between the respective grounding members and the terminals associated therewith without affecting the other terminals.

2. The socket of claim 1 wherein said first grounding member is radially offset from said first terminals such that a spark from one of said first terminals travels in a direction substantially perpendicular to the longitudinal axis of the tube.

3. The socket of claim 1 wherein said second grounding member is vertically offset from a portion of said second terminal such that a spark from said second terminal travels in a direction substantially parallel to the longitudinal axis of the tube.

4. The socket of claim 2 wherein said second grounding member is vertically offset from a portion of said second terminal such that a spark from said second terminal travels in a direction substantially parallel to the longitudinal axis of the tube.

5. The socket of claim 1 wherein said cap member silo filler extends substantially parallel to the longitudinal axis of the tube.

6. The socket of claim 1 wherein said support comprises a top plate, a bottom plate and an intermediate plate therebetween, portions of said first terminals and portions of said first grounding member being disposed intermediate said bottom plate and said top plate, said first grounding portions being radially spaced from said first terminal portions.

7. The socket of claim 6 wherein said first ground and terminal portions are secured to the upper face of said intermediate plate, and said first grounding portions are spaced outwardly from said first terminal portions.

8. The socket of claim 1 wherein said cap member and said support together define a spark chamber, said second terminal and said second grounding member extending into said spark chamber adjacent opposite ends thereof.

9. The socket of claim 8 wherein said cap member further defines a vent chamber in gaseous communication with said spark chamber.

10. The socket of claim 1 wherein said cap member is removable from said support.

11. The tube socket of claim 1 for use with a tube having a plurality of high voltage pins, each encased in its own protective silo, wherein said cap member defines a plurality of said silo fillers, said socket has a plurality of said second terminals extending into respective ones of said silo fillers and being adapted to receive respective ones of said high voltage pins, and a plurality of said second grounding members associated with respective ones of said second terminals.

12. The socket of claim 11 wherein said cap member and said support together define a plurality of individual spark chambers isolated from each other, each of said second terminals and each of said second grounding members extending into respective ones of said spark chambers adjacent opposite ends thereof.

13. The socket of claim 12 wherein said cap member further defines a plurality of vent chambers, each of said vent chambers being in gaseous communication with a respective one of said spark chambers and isolated from the other of said vent chambers and spark chambers.

14. The socket of claim 11 wherein said cap member is removable from said support and contains disposed therein all of said high voltage terminals.

15. The socket of claim 6 wherein said cap member is independently and directly secured both to said top plate and said bottom plate.

16. The socket of claim 1 wherein said second grounding member is of generally rod-like configuration and terminates adjacent said second terminal in an enlarged and smoothly contoured head.

17. A cap member for use with a tube socket having a protective silo open at one end thereof and a grounding member, comprising (A) an insulative housing including means for securing said housing to said tube socket, said housing defining a silo filler adapted to enter said protective silo through said open end thereof, a spark chamber, and a vent chamber in gaseous communication with said spark chamber; and (B) a terminal having one end thereof disposed in said silo filler to conductively receive a pin, the other end thereof extending from said housing for connection to an external circuit, and an intermediate portion thereof extending into said spark chamber and adapted to be positioned in general alignment with, and spaced from, said grounding member.

18. The cap member of claim 17 adapted for use with a tube socket having a plurality of protective silos, wherein said housing defines a plurality of said silo fillers, each adapted to enter a respective one of said protective silos, a like plurality of spark chambers electrically isolated from one another, and a like plurality of vent chambers, each of said vent chambers being in gaseous communication through said housing with only a respective one of said spark chambers.

19. A tube socket for use with a cathode ray tube of the type having a high voltage pin and a plurality of relatively low voltage pins spaced apart, with the high voltage pin being encased in a protective silo open at the top thereof, said socket comprising:

(A) a support having top and bottom surfaces;

(B) a plurality of first terminals mounted on said support, each of said first terminals being adapted to conductively receive a different one of the low voltage pins;

(C) a cap member secured to said support and defining a silo filler open at the bottom thereof and adapted to enter the tube silo; and (D) a second terminal mounted on said cap member, extending into said silo filler, and adapted to conductively receive the high voltage pin.

20. A tube socket for use with a cathode ray tube of the type having a high voltage pin and a plurality of relatively low voltage pins spaced apart, said socket comprising:

(A) a support having top and bottom surfaces;

(B) a plurality of first terminals mounted on said support, each of said first terminals being adapted to conductively receive a different one of the low voltage pins;

(C) a cap member secured to said support and defining a chamber to receive the high voltage pin;

(D) a second terminal mounted on said cap member, extending into said chamber, and adapted to conductively receive the high voltage pin;

(E) first and second grounding members mounted on said support and spaced from and associated with said first and second terminals, respectively; and (F) means for separately electrically connecting said first and second grounding members to ground, whereby a spark can independently bridge a gap between the respective grounding members and the terminals associated therewith without affecting the other terminals.

21. The tube socket of claim 20 for use with a tube having a plurality of high voltage pins, wherein said cap member defines a plurality of said chambers, said socket has a plurality of said second terminals extending into respective ones of said chambers and being adapted to receive respective ones of the high voltage pins, and a plurality of said second grounding members associated with respective ones of said second terminals.

22. The socket of claim 21 wherein said cap member and said support together define a plurality of individual spark chambers isolated from each other, each of said second terminals and each of said second grounding members extending into respective ones of said spark chambers adjacent opposite ends thereof.

23. The socket of claim 22 wherein said cap member further defines a plurality of vent chambers, each of said vent chambers being in gaseous communication with a respective one of said spark chambers and isolated from the other of said vent chambers and spark chambers.

24. The socket of claim 20 wherein said cap member is independently and directly secured to both said top and said bottom surfaces of said support.

25. A cap member for use with a tube socket having a protective silo open at one end thereof and a grounding member, comprising:

(A) an insulative housing including means for securing said housing to said tube socket, said housing defining a silo filler adapted to enter said protective silo through said open end thereof, and a spark chamber; and (B) a terminal having one end thereof disposed in said silo filler to conductively receive a pin, the other end thereof extending from said housing for connection to an external circuit, and an intermediate portion thereof extending into said spark chamber and adapted to be positioned in general alignment with, and spaced from, said grounding member.

26. The cap member of claim 25 adapted for use with a tube socket having a plurality of protective silos, wherein said housing defines a plurality of said silo fillers, each adapted to enter a respective one of said protective silos, and a like plurality of spark chambers electrically isolated from one another.

27. The cap member of claim 25 additionally including vent chamber means in gaseous communication through said housing with said spark chamber.

28. The cap member of claim 26 additionally including a plurality of vent chamber means, each of said vent chamber means being in gaseous communication with a respective one of said spark chambers and isolated from the other of said vent chamber means and spark chambers.

29. A tube socket for use with a cathode ray tube of the type having a high voltage pin and a plurality of relatively low voltage pins spaced apart, with the high voltage pin being encased in a protective silo, said socket comprising:

A. a support having top and bottom surfaces;

B. a plurality of first terminals mounted on said support, each of said first terminals being adapted to conductively receive a different one of the low voltage pins;

C. a member secured to said support and defining a silo filler adapted to enter the tube silo;

D. a second terminal mounted on said cap member, associated with said silo filler, and adapted to conductively receive the high voltage pin;

E. first and second grounding members mounted on said support and spaced from and associated with said first and second terminals, respectively; and F. means for separately electrically connecting said first and second grounding members to ground, whereby a spark can independently bridge a gap between the respective grounding members and the terminals associated therewith without affecting the other terminals.

30. The socket of claim 29 wherein said first grounding member is radially offset from said first terminals such that a spark from one of said first terminals travels in a direction substantially perpendicular to the longitudinal axis of the tube.

31. The socket of claim 29 wherein said second grounding member is vertically offset from a portion of said second terminal such that a spark from said second terminal travels in a direction substantially parallel to the longitudinal axis of the tube.

32. The socket of claim 30 wherein said second grounding member is vertically offset from a portion of said second terminal such that a spark from said second terminal travels in a direction substantially parallel to the longitudinal axis of the tube.

33. The socket of claim 29 wherein said support comprises a top plate, a bottom plate and an intermediate plate therebetween, portions of said first terminals and portions of said first grounding member being disposed intermediate said bottom plate and said top plate, said first grounding portions being radially spaced from said first terminal portions.

34. The socket of claim 33 wherein said first ground and terminal portions are secured to the upper face of said intermediate plate, and said first grounding portions are spaced outwardly from said first terminal portions.

35. In the socket of claim 29, structure defining a spark chamber at least in part extending from said support, said second terminal and said second grounding means extending into said spark chamber adjacent opposite ends thereof.

36. The socket of claim 35, in which said structure further defines a vent chamber in gaseous communication with said spark chamber.

37. The tube socket of claim 29 for use with a tube having a plurality of high voltage pins, each encased in its own protective silo, wherein said member defines a plurality of said silo fillers, said socket has a plurality of said second terminals associated with respective ones of said silo fillers and being adapted to receive respective ones of said high voltage pins, and a plurality of said second grounding members associated with respective ones of said second terminals.

38. The socket of claim 37 wherein said structure defines a plurality of individual spark chambers isolated from each other, each of said second terminals and each of said second grounding members extending into respective ones of said spark chambers adjacent opposite ends thereof.

39. The socket of claim 38 wherein said structure further defines a plurality of vent chambers, each of said vent chambers being in gaseous communication with a respective one of said spark chambers and isolated from the other of said vent chambers and spark chambers.

40. A tube socket for use with a cathode ray tube of the type having a high voltage pin and a plurality of relatively low voltage pins spaced apart, with the high voltage pin being encased in a protective silo open at the top thereof, said socket comprising:

A. a support having top and bottom surfaces;
B. a plurality of first terminals mounted on said support, each of said first terminals being adapted to conductively receive a different one of the low voltage pins;
C. a member secured to said support and defining a silo filler and adapted to enter the tube silo; and
D. a second terminal associated with said member, extending into said silo filler, and adapted to conductively receive the high voltage pin.

41. A tube socket for use with a cathode ray tube of the type having a plurality of high voltage pins and a plurality of relatively low voltage pins spaced apart, said socket comprising:

A. a support having top and bottom surfaces;
B. a plurality of first terminals mounted on said support, each of said first terminals being adapted to conductively receive a different one of the low voltage pins;
C. a member secured to said support and defining a plurality of said chambers at least in part extending from said support;
D. a plurality of second terminals mounted on said support, extending into respective ones of said chambers adjacent the support ends thereof and adapted to conductively receive respective ones of the high voltage pins;
E. a first grounding member and a plurality of second grounding members mounted on said support and spaced from and associated with said first terminal and the respective ones of said second terminals respectively, said second grounding members respectively extending into respective ones of said chambers adjacent the extending end thereof and being associated with respective ones of said second terminals; and
F. means of separately electrically connecting said first and second grounding members to ground, whereby a spark can independently bridge a gap between the respective grounding members and the terminals associated therewith without affecting the other terminals.

42. The socket of claim 41 wherein said member further defines a plurality of vent chambers, each of said vent chambers being in gaseous communication with a respective one of said spark chambers and isolated from the other of said vent chambers and spark chambers.

43. A tube socket for use with a tube having a protective silo comprising:

A. an insulative housing defining a silo filler adapted to enter said protective silo, and a spark chamber;
B. a terminal having one end thereof associated with said silo filler to conductively receive a pin, the other end thereof extending from said housing for connection to an external circuit, and an intermediate portion thereof extending into said spark chamber; and
C. a grounding member having a first portion extending into said spark chamber to a position spaced from said intermediate portion of said terminal, and having a second portion extending from said chamber.

44. The socket of claim 43 adapted for use with a tube having a plurality of protective silos, wherein said housing defines a plurality of said silo fillers, each adapted to enter a respective one of said protective silos, and a like plurality of spark chambers electrically isolated from one another.

45. The socket of claim 43 additionally including vent chamber means in gaseous communication through said housing with said spark chamber.

46. The socket of claim 44 additionally including a plurality of vent chamber means, each of said vent chamber means being in gaseous communication with a respective one of said spark chambers and isolated from the other of said vent chamber means and spark chambers.

47. A tube socket for use with a cathode ray tube of the type having a space therewithin and a plurality of high voltage pins and a plurality of relatively low voltage pins spaced apart, said socket comprising:

A. a support having top and bottom surfaces;
B. a plurality of first terminals mounted on said support, each of said first terminals being adapted to conductively receive a different one of the low voltage pins;
C. a plurality of members secured to said support and extending therefrom and adapted to enter said space within said tube;
D. a plurality of second terminals mounted on respective ones of said members and adapted to conductively engage respective ones of said high voltage pins;
E. a first grounding member and a plurality of second grounding members mounted on said support, said first grounding member being spaced from and associated with said first terminal and said second grounding members being respectively spaced from and associated with said second grounding members respectively; and
F. means for separately electrically connecting said first and second grounding members to ground, whereby a spark can independently bridge a gap between the respective grounding members and the terminals associated therewith without affecting the other terminals.

48. The socket of claim 47 wherein said structure defines a plurality of individual spark chambers isolated from each other, each of said second terminals and each of said second grounding members extending into respective ones of said spark chambers adjacent opposite ends thereof.

49. The socket of claim 48 wherein said structure further defines a plurality of vent chambers, each of said vent chambers being in gaseous communication with a respective one of said spark chambers and isolated from the other of said vent chambers and spark chambers.

50. A tube socket for use with a cathode ray tube of the type having a space therewithin and a high voltage pin and a plurality of relatively low voltage pins spaced apart, said socket comprising:

A. a support having top and bottom surfaces;

B. a plurality of first terminals mounted on said support, each of said first terminals being adapted to conductively receive a different one of the low voltage pins;

C. a member secured to said support and extending therefrom and adapted to enter said space within said tube;

D. a second terminal mounted on said member and adapted to conductively engage the high voltage pin;

E. first and second grounding members mounted on said support and spaced from and associated with said first and second terminals, respectively;

F. means for separately electrically connecting said first and second grounding members to ground, whereby a spark can independently bridge a gap between the respective grounding members and the terminals associated therewith without affecting the other terminals;

G. structure defining a spark chamber at least in part extending from said support, said second terminal and said second grounding means extending into said spark chamber adjacent opposite ends thereof; and H. said structure further defining a vent chamber in gaseous communication with said spark chamber.

* * * * *